2 Sheets—Sheet 1.

J. FORTENBACH.
DIES FOR MAKING WATCH-CASE BEZELS.

No. 185,173. Patented Dec. 12, 1876.

Witnesses:
James H. Hunter
K. Newell

Inventor:
Joseph Fortenbach

THE GRAPHIC CO. N.Y.

2 Sheets—Sheet 2.

J. FORTENBACH.
DIES FOR MAKING WATCH-CASE BEZELS.

No. 185,173. Patented Dec. 12, 1876.

Witnesses:
K. Newell
James H Hunter

Inventor:
Joseph Fortenbach

THE GRAPHIC CO. N.Y.

UNITED STATES PATENT OFFICE.

JOSEPH FORTENBACH, OF CARLSTADT, NEW JERSEY.

IMPROVEMENT IN DIES FOR MAKING WATCH-CASE BEZELS.

Specification forming part of Letters Patent No. 185,173, dated December 12, 1876; application filed May 7, 1875.

*To all whom it may concern:*

Be it known that I, JOSEPH FORTENBACH, of Carlstadt, Bergen county, in the State of New Jersey, have invented certain new and useful Improvements in the Manufacture of Bezels for Watch-Cases, of which the following is a full, clear, and exact description, reference being had to the drawings, forming a part of this specification.

Watch-cases have heretofore been made in the following manner: The metal was first cast into bars. Bezels and centers were then drawn from the bars by a draw-bench through a draw plate or dies, then cut off in suitable lengths, soldered, and swaged down to a suitable shape and size. For the backs and caps plates were rolled out through rollers to the required thickness, cut in shape with shears, and swaged up by followers, made usually of brass or composition. Snaps were then soldered on and the pieces finished up in lathes, and the required form given to them by means of gravers and different other and well-known tools.

By my improvements I am enabled to manufacture a watch-case without the necessity of first drawing any of the parts from bars, and then soldering the ends of the sections cut therefrom, or of making the snaps separate from such parts, and subsequently uniting them by means of solder.

By such improvements all the parts referred to are formed up by means of a series of dies, the centers containing shoulders for bezels and caps, back and front backs, the bezels to their proper shape, and the covers containing snaps formed solidly thereto, thereby avoiding the necessity of solder and much manual labor in the attachment of such snaps.

Figure 1:
Figure 5:
Figure 7:
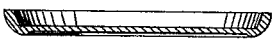
Figure 3:
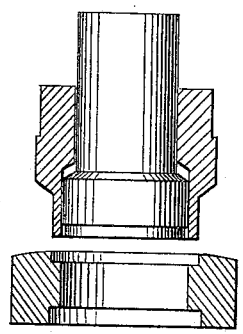
Figure 2:
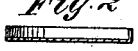
Figure 4:
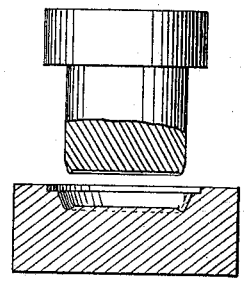
Figure 6:
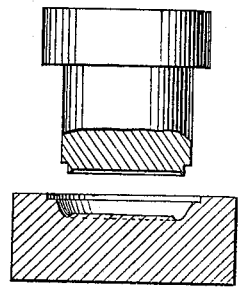

To make bezels, which is the subject-matter of the present application, a round blank, Fig. 1, is cut from a sheet of metal, and the shape given to it, as seen in Fig. 2, by means of dies, as shown in Fig. 3. The piece is then placed in dies shown in Fig. 4, and the shape given to it at the margin, as seen in Fig. 5, and by a second operation with the last referred to lower die, and an upper die, such as shown in Fig. 6, not quite so deep as the former upper die, the outer rim is crowded down so as to increase the thickness of the bezel at the point where the snap is formed, as seen in Fig. 7.

Figure 9:
Figure 10:
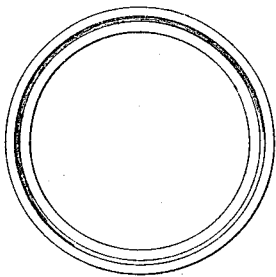
Figure 8:
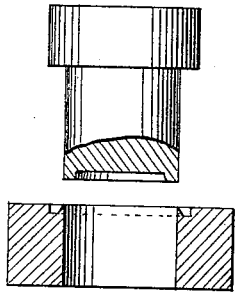

The piece is then put into dies shown in Fig. 8, and a round plate is cut out of it, thus leaving the interior of the bezel suitable for working on in the finishing of it up, as shown in Figs. 9 or 10.

I claim—

1. The combination of the dies shown in Figs. 3, 4, 6, and 8, substantially as and for the purpose described.

2. The dies shown in Fig. 4, substantially as described.

3. The dies shown in Fig. 6, substantially as described.

JOSEPH FORTENBACH.

Witnesses:
JAMES H. HUNTER,
K. NEWELL.